Jan. 8, 1946.                M. R. FOX                2,392,471
                         POWER TRANSMISSION
                    Filed Feb. 11, 1942          2 Sheets-Sheet 1
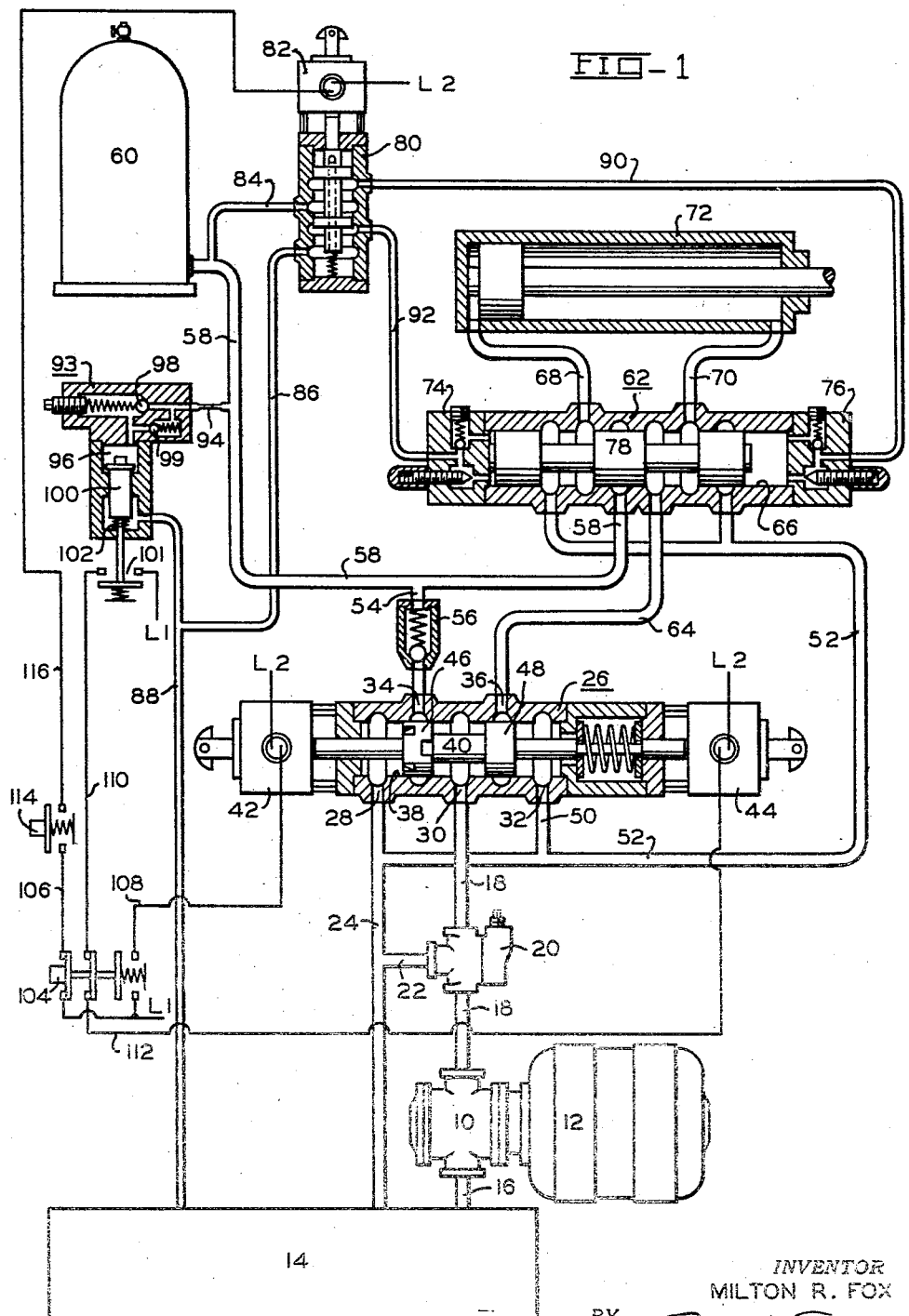
INVENTOR
MILTON R. FOX
BY
         ATTORNEY Jan. 8, 1946.   M. R. FOX   2,392,471
POWER TRANSMISSION
Filed Feb. 11, 1942   2 Sheets—Sheet 2
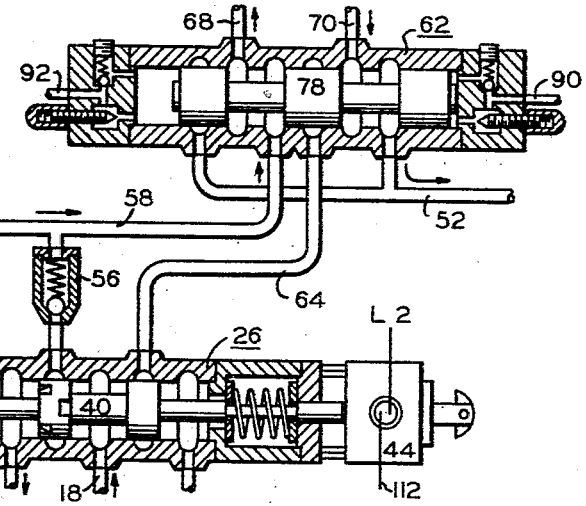
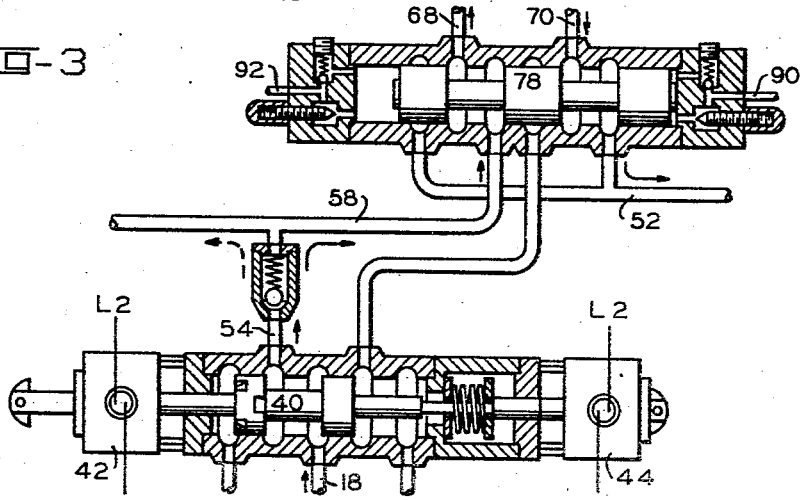
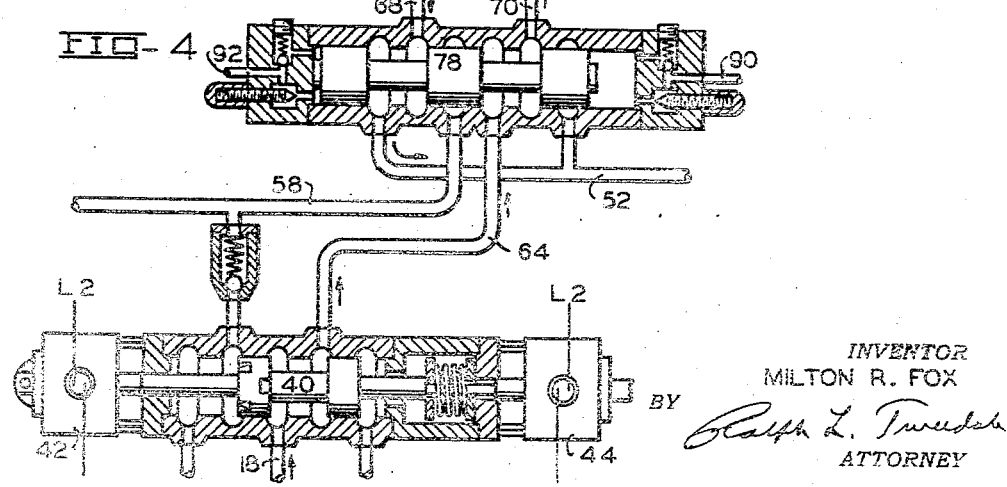
INVENTOR
MILTON R. FOX
BY
*Ralph L. Tweedale*
ATTORNEY Patented Jan. 8, 1946

2,392,471

UNITED STATES PATENT OFFICE 2,392,471

POWER TRANSMISSION

Milton R. Fox, Detroit, Mich., assignor to Vickers Incorporated, Detroit, Mich., a corporation of Michigan Application February 11, 1942, Serial No. 430,322

6 Claims. (Cl. 60—51)

This invention relates to power transmissions, particularly to those of the type comprising two or more fluid pressure energy translating devices, one of which may function as a pump and another as a fluid motor.

The invention is more particularly concerned with a power transmission system utilizing a single pump and wherein is incorporated an accumulator for supplying fluid at a rate in excess of the delivery rate of the pump. Certain machines, such as die casters, injection molding machines, etc., frequently require a very rapid stroke on the injector cylinder which is in the nature of a momentary peak load most advantageously handled by the use of an accumulator.

It is an object of the present invention to provide an improved control system for a circuit of this character wherein a single pump may be utilized to maintain the accumulator charged during off-peak periods in the cycle and, at the same time, to utilize the pump for supplying fluid directly and independently of the accumulator at other times during a cycle.

It is a further object to provide such a control system utilizing a pressure switch together with a solenoid-operated, spring-centered, open-center valve.

Further objects and advantages of the present invention will be apparent from the following description, reference being had to the accompanying drawings wherein a preferred form of the present invention is clearly shown.

In the drawings:

Figure 1 is a diagrammatic view of a power transmission system incorporating a preferred form of the present invention.

Figures 2, 3, and 4 are diagrammatic views of the main control features of the power transmission circuit of Figure 1 showing different operations.

In the embodiment of the invention shown in Figure 1, the circuit comprises a pump 10 adapted to be driven by a suitable prime mover, such as an electric motor 12. Pump 10 withdraws fluid from a tank 14 through a suction conduit 16 and delivers the same to a delivery conduit 18. The latter has a relief valve 20 of conventional construction for bypassing oil to the tank 14 through conduits 22 and 24 whenever a predetermined pressure is exceeded in the delivery conduit 18.

Conduit 18 extends beyond relief valve 20 to a directional, spring-centered, four-way valve 26. The latter comprises a main body having annular ports 28, 30, 32, 34 and 36 formed at spaced positions along bore 38. Valve spool 40, arranged to be actuated by solenoids 42 and 44, is slidable across the ports to selectively connect port 30 with either port 34 when in its lefthand position or port 36 when in its righthand position. The spool 40 comprises two lands 46 and 48 of which 46 is provided with a plurality of flutes arranged on its periphery for bypassing oil therethrough to the tank when the spool 40 is in central position, illustrated.

Port 30 of valve 26 is connected to the conduit 18, while ports 28 and 32 are connected to drain conduits 24 and 50, respectively, which communicate with a conduit 52. Port 34 connects with a conduit 54 which contains a check valve 56. Conduit 54 extends beyond check valve 56 to a conduit 58 which communicates with an accumulator 60 and with a reversing valve 62. Port 36 of valve 26 is connected by a conduit 64 with the valve 62. The latter comprises a main body having a longitudinal bore 66 provided with a plurality of annular ports arranged along its length, the tank ports of which are connected to the conduit 52, while the cylinder ports are connected to conduits 68 and 70 which lead to the head and rod ends, respectively, of a cylinder-and-piston motor 72. Valve 62 is provided with end caps 74 and 76 which contain small throttles or dwell valves which restrict the liquid discharge from the pilot operating chambers and thus slow down the speed of the spool 78 which is slidably mounted in bore 66 to control communication between the various ports.

The spool 78 of valve 62 is arranged to be shifted under the control of a spring-offset, pilot, four-way valve 80 operated by a solenoid 82. The pressure port of the valve 80 is supplied with oil from the accumulator 60 through a conduit 84 which connects with the conduit 58. The tank port of valve 80 communicates with the tank through conduits 86 and 88, while the cylinder ports connect by conduits 90 and 92 to the pilot operating chambers of the valve 62.

Accumulator conduit 58 communicates with a pressure switch 93 through a constricted passage 94. Liquid entering chamber 96, by overcoming the adjusted spring pressure on the inlet ball 98, will push down the piston 100 and open switch 101. When the pressure in conduit 58 drops below the predetermined value, the spring 102 will push piston 100 upwardly, forcing the liquid out of the chamber 96 into the system through ball check 99. When the piston 100 reaches the top it will close switch 101, causing an operation, hereinafter disclosed, to take place. Pressure switch 93 is connected with the tank conduit 88 which serves to drain any leakage of fluid that might occur past the piston 100.

For the purpose of controlling the solenoids 42, 44 and 82 which operate valves 26 and 80, respectively, a control circuit is provided as follows: From one side of a suitable source of electric current supply designated as L¹, a push-button switch 104 is adapted to normally establish a connection with a conductor 106 and break a connection with a conductor 108 which leads to the solenoid 42 and to the other side of the power supply designated L². Switch 104 also connects conductors 110 and 112 when in its normal position, illustrated, of which 110 leads from L¹ through pressure switch 101 and of which 112 leads to the solenoid 44 and to the other side of the power supply designated L².

The initial energizing circuit of the solenoid 82 is controlled by a normally-open, momentary-contact, push-button, starting switch 114 connected by conductor 116 with solenoid 82, and by conductor 106 with switch 104.

In operation, with the parts in the position shown in Figure 1, the device is in its rest position, the full delivery passing through delivery conduit 18, through valve 26, as hereinbefore disclosed, and through conduit 24 to the tank 14. The pump is thus effectively bypassed, and no fluid is delivered beyond valve 26.

When it is desired to start the device, the start switch 114 may be closed to condition the circuit for a rapid traverse forward, as shown in Figure 2. This energizes solenoid 82 through conductors 106 and 116, thereby shifting the spool of the valve 80 downward and admitting pilot pressure oil from the accumulator conduit 68 to the pilot conduit 92 where it flows to the lefthand end of the reversing valve 62. The spool 78 of valve 62 is accordingly shifted to the right, establishing a connection between conduits 58 and 68 to thereby admit pressure oil from the accumulator 60 to the head end of the motor 72. As the accumulator supplies a large amount of fluid under high pressure, the piston in motor 72 is advanced rapidly, the oil discharged from the rod end being returned to the tank through conduits 70, 52 and 24.

The piston in motor 72 will continue to advance until the pressure in the accumulator conduit 58 drops below the value of the setting of the pressure switch 93. This will cause piston 100 therein to move upwardly, closing electric contact 101 which will, through conductors 110 and 112, energize the solenoid 44 of valve 26. The spool 40 therein will be shifted to the left, establishing a connection between conduits 18 and 54 to thereby admit pressure fluid into conduit 58, as illustrated in Figure 3. This will direct the full pump delivery to the motor 72 to supplement the accumulator supply, and, upon completing the work stroke, to recharge the accumulator 60. The latter will be so charged until pressure in conduit 58 rises above the predetermined value which will actuate pressure switch 93, causing it to break its aforesaid connection, deenergizing solenoid 44. This will cause spool 40 of valve 26 to return to its centered position, illustrated in Figure 1, to again bypass the pump delivery to the tank in a manner hereinbefore disclosed.

When the above operations have taken place and to effect a return stroke, return switch 104 is depressed to accordingly condition the circuit, as shown in Figure 4. This will deenergize solenoid 82, if not previously so deenergized by the releasing of the starting switch 114, and energize solenoid 42 of valve 26. This will also deenergize solenoid 44 by breaking the connection between the conductors 112 and 110, if not previously so deenergized by the pressure switch 93. The deenergization of solenoid 82 of valve 80 will cause the spool therein to be lifted upward to establish a connection between conduits 84 and 90 to thereby admit pilot pressure fluid to the righthand end of the valve 62. The spool 78 therein is accordingly shifted to the left, connecting cylinder conduit 70 with pressure conduit 64 and cylinder conduit 68 with tank conduit 52.

Energization of the solenoid 42 shifts the spool 40 of the valve 26 to the right, connecting conduits 18 and 64 to thereby admit pressure fluid from the pump 10 to the rod end of the motor 72, returning the piston therein to the starting position.

Thus it will be seen that the invention herein disclosed provides a means for producing a very rapid forward work stroke by the use of an accumulator and a single pressure energy translating device, the latter supplying pressure fluid to the former to recharge it and also to complete the work stroke of the piston if the latter stops short thereof.

While the form of embodiment of the invention as herein disclosed constitutes a preferred form, it is to be understood that other forms might be adopted, all coming within the scope of the claims which follow.

What is claimed is as follows:

1. In a hydraulic power transmission system the combination of a constantly running pump, an elastically loaded accumulator, a fluid motor to be operated on a rapid stroke at a greater rate of fluid displacement than the pump can deliver, a control valve connected between the accumulator and the motor for applying fluid from the accumulator to the motor, a second valve and connections selectively operable to direct the pump delivery either to the accumulator, to the motor directly or to exhaust, electric actuating means for the second valve, and a pressure switch responsive to a predetermined decrease in accumulator pressure for controlling said actuating means to thereby connect the pump delivery to the accumulator.

2. In a hydraulic power transmission system the combination of a constantly running pump, an elastically loaded accumulator, a fluid motor to be operated on a rapid stroke at a greater rate of fluid displacement than the pump can deliver, a directional control valve connected between the accumulator and the motor for selectively applying fluid from the accumulator to the motor for actuation thereof in one direction or applying fluid from the pump directly for actuation thereof in the opposite direction, a second valve and connections selectively operable to direct the pump delivery either to the accumulator, to the motor directly or to exhaust, electric actuating means for the second valve, and a pressure switch responsive to a predetermined decrease in accumulator pressure for controlling said actuating means to thereby connect the pump delivery to the accumulator.

3. In a hydraulic power transmission system the combination of a constantly running pump, an elastically loaded accumulator, a fluid motor to be operated on a rapid stroke at a greater rate of fluid displacement than the pump can deliver, a directional control valve connected between the accumulator and the motor for selectively applying fluid from the accumulator to the motor for actuation thereof in one direction or applying fluid from the pump directly for actuation thereof in the opposite direction, a second valve and connections selectively operable to direct the pump delivery either to the accumulator, to the motor directly or to exhaust, electric actuating means for the second valve, a pressure switch responsive to a predetermined decrease in accumulator pressure for controlling said actuating means to thereby connect the pump delivery to the accumulator, and additional switch means for disabling the pressure switch while the pump is supplying fluid to the motor directly.

4. A combined accumulator-supplied and direct pump-supplied hydraulic system having but a single pump comprising an open-center, spring-centered, solenoid-controlled, four-way valve, connections for directing pump delivery from one port of the four-way valve to join with the accumulator delivery and for directing the pump delivery alone from another port of the four-way valve, and a pressure switch responsive to accumlator pressure and connected to control the four-way valve to direct pump delivery to the accumulator in response to a predetermined fall in pressure therein.

5. A combined accumulator-supplied and direct pump-supplied hydraulic system having but a single pump comprising an open-center, spring-centered, solenoid-controlled, four-way valve, connections for directing pump delivery from one port of the four-way valve to join with the accumulator delivery and for directing the pump delivery alone from another port of the four-way valve, a pressure switch responsive to accumulator pressure and connected to control the four-way valve to direct pump delivery to the accumulator in response to a predetermined fall in pressure therein, additional switch means connected to control the four-way valve to direct pump delivery from said other port, and means for disabling the pressure switch in response to actuation of said additional switch.

6. In a hydraulic power transmission system the combination of a constantly running pump, an elastically loaded accumulator, a fluid motor to be operated on a rapid stroke at a greater rate of fluid displacement than the pump can deliver, a control valve connected between the accumulator and the motor for directing fluid from the accumulator to the motor for actuation thereof in one direction, a second valve and connections selectively operable to direct the pump delivery either to the accumulator, to the motor directly or to exhaust, electric actuating means for the second valve, and a pressure switch responsive to a predetermined decrease in accumulator pressure for controlling said actuating means to thereby connect the pump delivery to the accumulator.

MILTON R. FOX.